May 9, 1961 H. C. PAULSEN 2,983,270
CEMENT HANDLING APPARATUS
Filed July 29, 1958 3 Sheets-Sheet 1

Inventor
Hans C. Paulsen
By his Attorney
Everard D. Littlefield

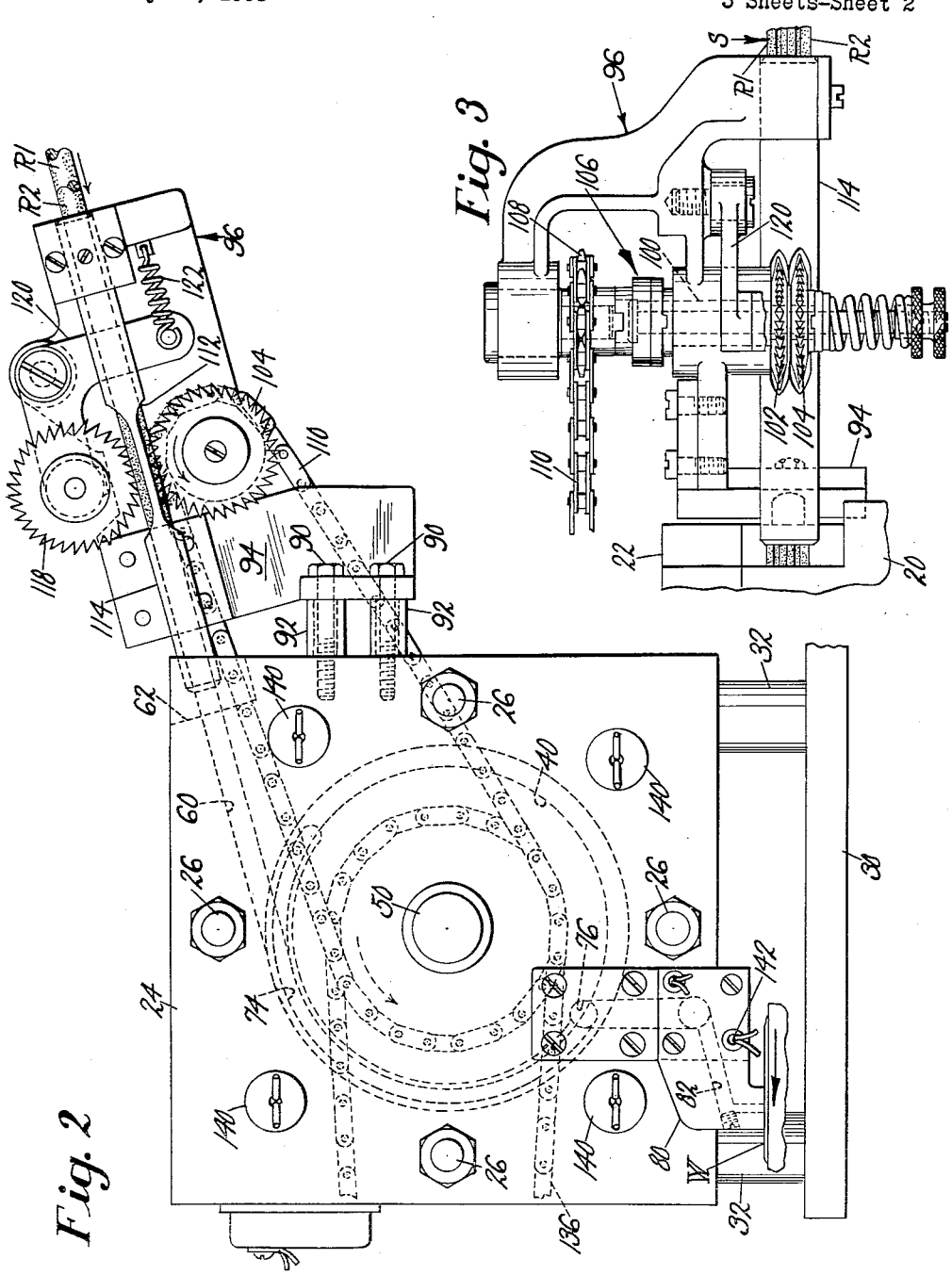

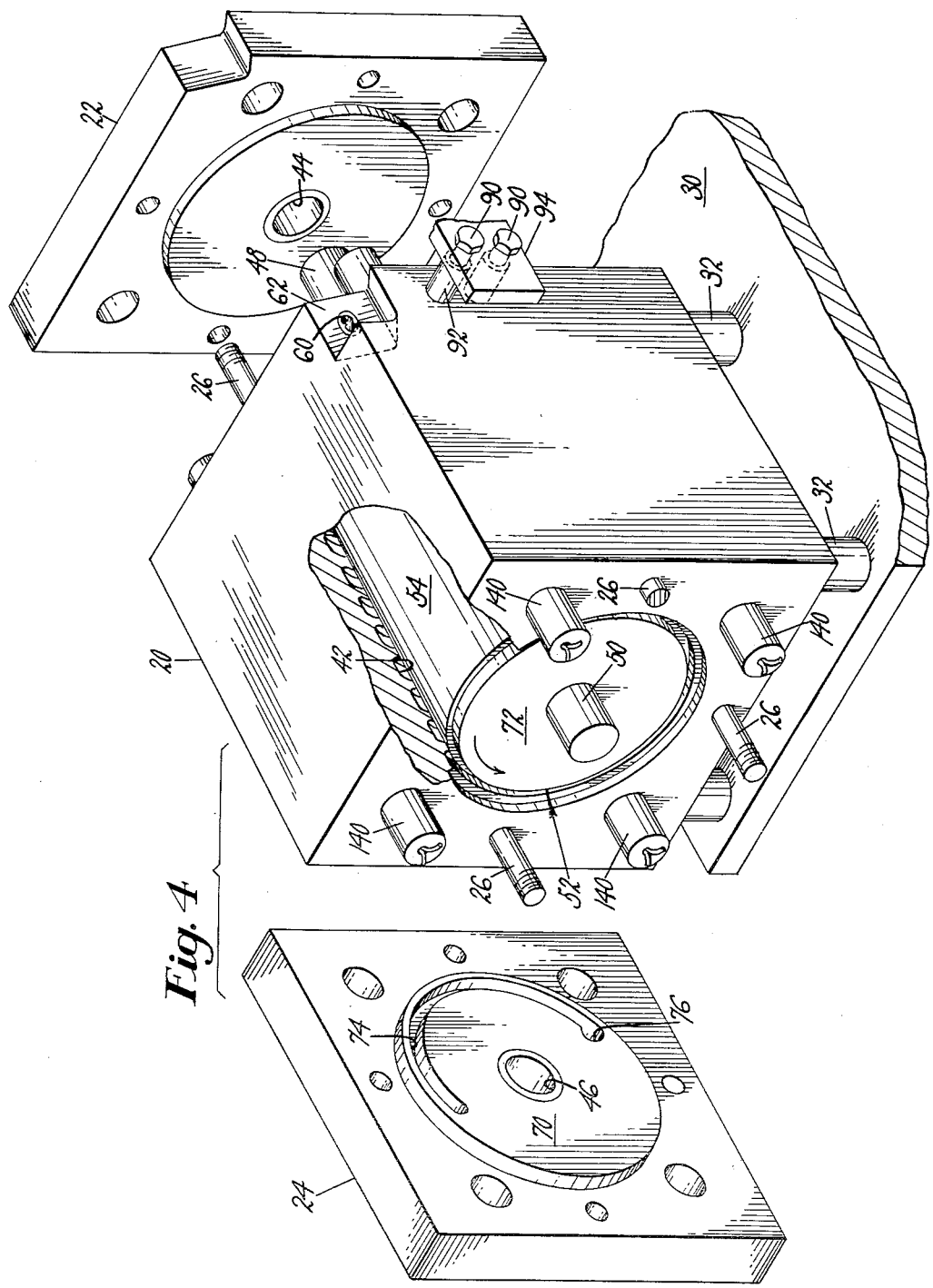

United States Patent Office 2,983,270
Patented May 9, 1961

2,983,270
CEMENT HANDLING APPARATUS

Hans C. Paulsen, Lexington, Mass., assignor to United Shoe Machinery Corporation, Flemington, N.J., a corporation of New Jersey Filed July 29, 1958, Ser. No. 751,786

4 Claims. (Cl. 126—343.5)

This invention relates to cement handling apparatus and particularly to a novel and improved apparatus for melting and feeding thermoplastic material such, for example, as cement, in the form of an elongated solid strip or strand.

An object of this invention is to provide a melting and feeding apparatus which is relatively simple in construction, efficient in operation, and capable of handling large quantities of thermoplastic material, such as cement, supplied in a solid strip or strand form, melting the material, and delivering the molten material at a desired temperature through a discharge or outlet passage without, at any time, subjecting the material to temperatures much, if any, higher than the desired temperature at delivery. With this purpose in view, the herein illustrated apparatus includes a heated hollow casing having a generally cylindrical chamber formed therein with the surface of this chamber provided with a helical groove extending from one end of the chamber to the other, a rotary member journaled within the casing and having a peripheral surface in engagement with the surface of the chamber, thereby to provide a helical passage extending axially of the casing, the casing also having an inlet passage extending tangentially from the exterior of the casing to the helical groove adjacent one end of the chamber and an outlet passage in communication with the other end of the groove, together with means for rotating the rotary member to cause it to exert a frictional drag on the leading end of a solid strip or strand of thermoplastic material tending to draw the material into the helical passage through the inlet passage to force the strand along the helical passage in which it is melted and to extrude molten adhesive through the outlet passage. More particularly, the surface of the chamber in the casing is of gradually increasing diameter from one end to the other and the rotary member has a tapering peripheral surface which cooperates with the surface of the chamber to provide a helical passage of uniform width and gradually decreasing radial dimension extending from the end of the chamber adjacent to the inlet passage to the end of the chamber adjacent to the outlet passage.

The above and other objects and features of the invention will appear in the following detailed description of the preferred embodiment which is illustrated in the accompanying drawings, and will be pointed out in the claims.

In the drawings,

Fig. 2 is a view in end elevation of the apparatus shown in Fig. 1;

Fig. 3 is a plan view of a portion of the apparatus shown in Fig. 2; and

Fig. 4 is an exploded view of a portion of the apparatus.

Figure 1:
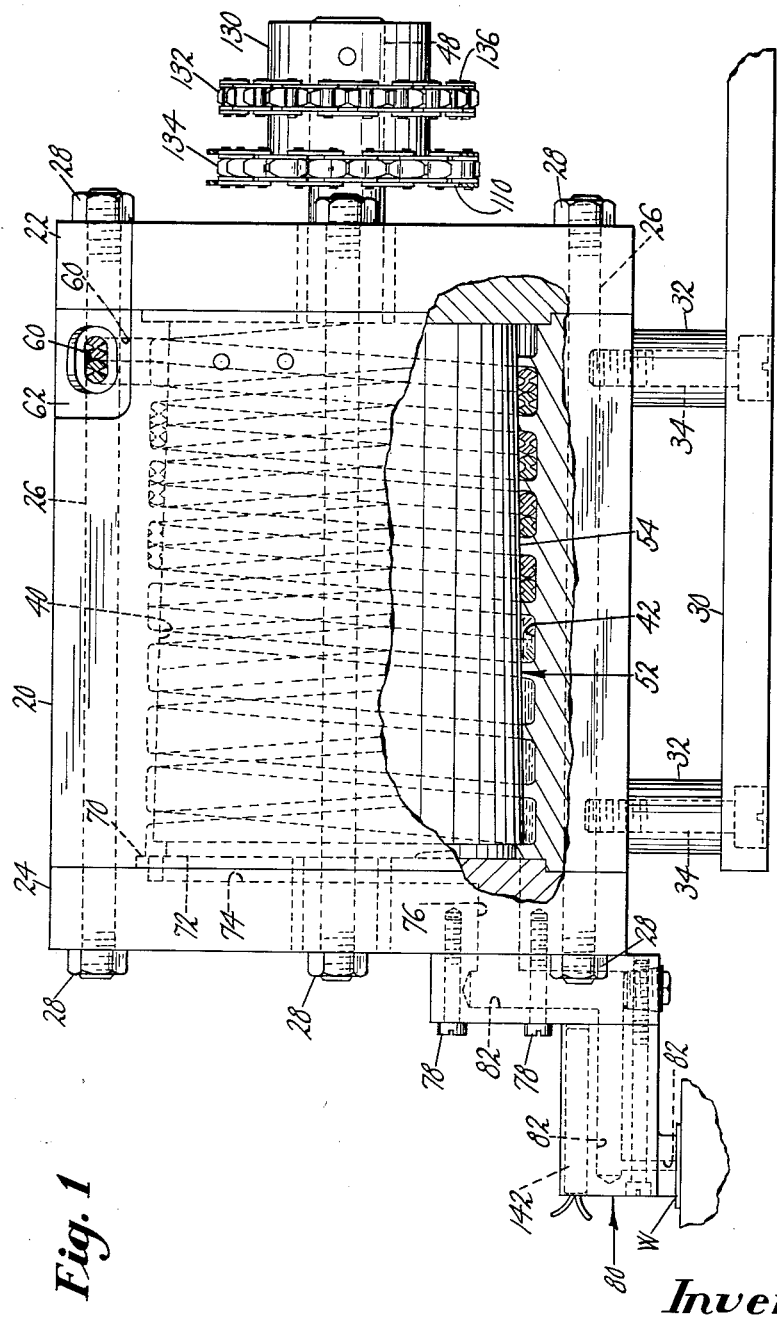
Fig. 1 is a view in side elevation, and with certain parts broken away and others shown in vertical section, of apparatus embodying the features of this invention.

Referring to these drawings, the apparatus which is illustrated therein comprises a casing having a body portion 20 and two end plates 22, 24 secured to the body portion by means of tie rods 26, 26 and nuts 28, 28. The casing is mounted on a supporting table, or bench, indicated by the reference character 30, by means of spacer blocks 32 and screws 34, 34, Fig. 1. Extending through the casing 20 is a tapering bore or chamber providing a conical surface 40 the diameter of which gradually increases from the right-hand end of the chamber to the left-hand end, Fig. 1, and cut into this surface is a helical groove 42 of uniform root diameter. Rotatably mounted in bearings 44, 46, provided, respectively, in the two end plates 22, 24, Fig. 4, are shaft portions 48, 50 formed integrally with a rotary member 52 which has a conical surface 54 complemental to the surface 40 of the chamber in the casing 20 and which, together with the groove 42, forms a helical passageway of generally rectangular cross section and of gradually decreasing radial dimension extending from the right-hand end of the casing, Fig. 1, to the left-hand end thereof.

Adjacent to its right-hand end, Fig. 1, the body portion 20 of the casing is provided with an inlet passage 60 which extends inwardly, from a surface 62 cut into the casing, in a direction substantially tangential to the surface 40 of the chamber in the casing, and which actually comprises two adjacent and partially merging cylindrical bores. The plate 24 at the left-hand end of the body portion of the casing 20 has a cylindrical boss 70, Fig. 4, which bears against the left-hand end face 72 on the rotary member 52 and this boss is provided with an arcuate groove 74. This groove is in communication with the left-hand end portion of the helical groove 42 and with an outlet passage 76 formed in the plate 24. Secured to this end plate by screws 78 is a discharge nozzle 80 provided with a passageway 82 which registers at one end with the aforementioned outlet passage 76.

Supported on the body portion 20 of the casing, by means of screws 90, 90 and spacer blocks 92, 92, is a bracket member 94, and secured to this bracket member is a frame construction, indicated generally by the reference character 96, Figs. 2 and 3. Journaled in a bearing portion forming part of this frame member is a sleeve 100 carrying two toothed feed wheels 102, 104 adapted to be frictionally driven, through a slip clutch construction indicated generally by the reference character 106, sprocket 108, and chain 110, in the direction of the arrow, Fig. 2. These feed wheels are adapted to engage a strip S of thermoplastic material, herein illustrated as being two separate rods or strands of cement $R_1$, $R_2$, through a lower cut-away portion 112 of a guide sleeve 114, supported on the frame construction 96. For holding these rods against the feed wheels 102, 104, a pair of idler wheels 118, 118 are mounted on a lever 120 and urged yieldingly into engagement with the rods by means of a tension spring 122, Fig. 2.

The shaft 48 extends beyond the end plate 22, Fig. 1, and has mounted thereon a hub member 130 which is provided with two sprocket portions 132 and 134. The chain 110, mentioned above, is trained over the sprocket 134, while a driven chain 136, extending from the sprocket to a drive motor, not shown, is trained over the sprocket 132. Plug-type electrical heating units 140, 140 and 142 are located in the body portion 20 of the casing and in the nozzle 80, respectively. These electrical heating units are connected to a source of electrical energy through suitable thermostatic controls, not shown, for regulating the temperature of the casing and nozzle.

In use, when the electric motor, not shown, is started, the member 52 and feed wheels 102, 104 will be rotated in the directions indicated by the arrows in Fig. 2, the member 52 being positively driven while the feed wheels are driven frictionally through the action of the slip clutch 106. The leading end of the strand S, herein illustrated by way of example as comprising the two rods $R_1$ and $R_2$, is now forced along through the inlet passage 60 and into the right-hand end of the helical passageway formed by the helical groove 42 and the surface 54 on the member 52. As the strand is moved along the helical passageway it is wrapped around the surface 54 of the rotating member 52. Preferably, the peripheral speed of this surface is somewhat greater than the linear speed of movement of the strand by the feed wheels. Accordingly, the frictional drag of the surface 54 on the strand, which is wrapped more and more around the member 52, soon takes control and the strand is moved along in the helical passageway at a speed slightly greater than that imparted to it by the feed wheels, this movement of the strand being permitted by the action of the slip clutch 106.

As the strand is thus moved along through the helical passageway it is gradually heated, softened, and eventually melted. Preferably, the rate of movement of the strand and the temperature of the casing is such that the strand is melted at a point approximately half way along the helical passageway, see Fig. 1. Thereafter, as the molten thermoplastic material is forced along the helical passageway toward the outlet passage 76 by the solid strand which is being drawn into the passageway by the rotary member 52, it continues to absorb heat from the casing and therefore may be delivered through the nozzle 80 and onto a work piece W, Fig. 2, at the desired temperature.

With this improved arrangement, by causing the strand of solid thermoplastic material to move along the helical passageway of considerable length by the action of the rotary member 52, the strand may be gradually melted and the molten material brought to a desired temperature as delivered through the outlet passage 76 and nozzle 80 without at any time subjecting the material to a temperature much, if any, greater than that desired in the molten material as it is extruded through the nozzle. In this way, all danger of damage to the thermoplastic material as the result of subjecting it to high temperatures is avoided. Obviously, by making the helical passageway longer, the rate of movement of the solid strand can be speeded up and the volumetrical capacity of the apparatus increased and a similar increase in volumetric capacity may be obtained by making the helical passageway of greater cross-sectional area so as to accommodate a larger strand of thermoplastic material. Also, because of the frictional drag of the member 52 on the solid strand which provides what may be termed a "capstan effect," and the pumping action which results from the frictional drag of the surface 54 on the molten material, the need for any additional pumping means for delivering the molten material through the nozzle 80 is avoided.

Referring again to the mode of operation of the improved apparatus which has been described above, as explained therein the feed wheels 102, 104 are required only to feed the leading end of the strand of thermoplastic material initially along the inlet passage and into contact with the surface 54 on the rotary member 52 and, thereafter, this strand is drawn along by the rotary member. Accordingly, the feed wheel arrangement herein disclosed may be replaced by a feeding mechanism similar to that disclosed and claimed in United States Letters Patent No. 2,783,735, granted March 5, 1957, on an application filed in the name of the present inventor, or, if desired, the strand could be initially fed into the apparatus manually.

Having thus described my invention, what I claim as new and desire to secure by Letters Patent of the United States is:

1. Apparatus for melting and feeding thermoplastic material in the form of a strip or strand comprising a hollow casing having a generally cylindrical chamber formed therein, the surface of said chamber being cut away to provide a helical groove extending from one end of the chamber to the other end, a rotary member journaled in said casing and having a peripheral surface in engagement with the surface of said chamber and cooperating therewith to provide a helical passage extending axially of said rotary member, said casing being provided with an inlet passage extending tangentially of the rotary member from the exterior of the casing to the helical groove adjacent to one end thereof and with an outlet passage in communication with the other end of said groove, means for heating the casing, means for feeding the leading end of a solid strand of thermoplastic material through the inlet passage and into said helical passage, and means for rotating said rotary member to cause it to draw the leading end of a solid strand of thermoplastic material into the helical passage through said inlet passage, to force the strand along the helical passage in which it is melted and to extrude molten thermoplastic material out through said outlet passage.

2. Apparatus for melting and feeding thermoplastic material in the form of a rod or strand comprising a hollow casing having a generally cylindrical chamber formed therein, the surface of said chamber being cut away to provide a helical groove of substantially rectangular cross section extending from one end of the chamber to the other end, a rotary member journaled in said casing and having a peripheral surface in engagement with the surface of said chamber and cooperating therewith to provide a helical passage extending axially of said rotary member, said casing being provided with an inlet passage of substantially rectangular cross section extending tangentially of the rotary member from the exterior of the casing to the helical groove adjacent to one end thereof and with an outlet passage in communication with the other end of said groove, means for heating the casing, means for feeding the leading end of a solid strand of thermoplastic material through the inlet passage and into said helical passage, and means for rotating said rotary member to cause it to draw the leading end of said solid strand of thermoplastic material into the helical passage through said inlet passage to force the strand along the helical passage in which it is melted and to extrude molten thermoplastic material out through said outlet passage.

3. Apparatus for melting and feeding thermoplastic material in the form of a solid rod or strand comprising a hollow casing having a generally cylindrical chamber formed therein, the surface of said chamber being of gradually increasing diameter from one end to the other and cut away to provide a helical groove of gradually decreasing radial depth extending from the smaller end of the chamber to the larger end, a rotary member journaled in said casing and having a tapering peripheral surface in engagement with the surface of said chamber and cooperating therewith to provide a helical passage of uniform width and gradually decreasing radial dimension extending axially of said rotary member from the smaller end of the chamber to the larger end thereof, said casing being provided with an inlet passage extending tangentially of the rotary member from the exterior of the casing to the helical groove in a location adjacent to the smaller end of said chamber and with an outlet passage in communication with the other end of said groove, means for heating the casing, means for feeding the leading end of a solid strand of thermoplastic material through the inlet passage and into said helical passage, and means for rotating said rotary member to cause it to draw the leading end of said solid strand of thermoplastic material into the helical passage through said inlet passage, to force the strand along the helical passage in which it is melted and to extrude molten thermoplastic material out through said outlet passage.

4. Apparatus for melting and feeding thermoplastic material in the form of a solid rod or strand comprising a hollow casing having a generally cylindrical chamber formed therein, the surface of said chamber being of gradually increasing diameter from one end to the other and cut away to provide a helical groove of substantially rectangular cross section and of gradually decreasing radial depth extending from the smaller end of the chamber to the larger end, a rotary member journaled in said casing and having a tapering peripheral surface in engagement with the surface of said chamber and cooperating therewith to provide a helical passage of uniform width and gradually decreasing radial dimension extending axially of said rotary member from the smaller end of the chamber to the larger end thereof, said casing being provided with an inlet passage extending tangentially of the rotary member from the exterior of the casing to the helical groove in a location adjacent to the smaller end of said chamber and with an outlet passage in communication with the other end of said groove, means for heating the casing, means for feeding the leading end of a solid strand of thermoplastic material through the inlet passage and into said helical passage, and means for rotating said rotary member to cause it to draw the leading end of said solid strand of thermoplastic material into the helical passage through said inlet passage, to force the strand along the helical passage in which it is melted and to extrude molten thermoplastic material out through said outlet passage.

References Cited in the file of this patent

UNITED STATES PATENTS

| | | |
|---|---|---|
| 1,810,083 | Norinder | June 16, 1931 |
| 1,980,589 | Acree | Nov. 13, 1934 |